United States Patent

Milde et al.

Patent Number: 5,976,323
Date of Patent: Nov. 2, 1999

[54] METHOD AND A DEVICE FOR THE CONTROL OF A DISTILLATION OR CONDENSATION APPARATUS

[76] Inventors: Eckhardt Milde, Lubminer Pfad 14, D-13503 Berlin, Germany; Gunnar Müller, Amendestrasse 65, D-13407 Berlin, Germany

[21] Appl. No.: 08/632,478

[22] PCT Filed: Aug. 24, 1995

[86] PCT No.: PCT/DE95/01176

§ 371 Date: Jul. 8, 1996

§ 102(e) Date: Jul. 8, 1996

[87] PCT Pub. No.: WO96/05901

PCT Pub. Date: Feb. 29, 1996

[30] Foreign Application Priority Data

Aug. 24, 1994 [DE] Germany ............................. 44 31 400

[51] Int. Cl.⁶ ........................................................ B01D 3/42
[52] U.S. Cl. .................................................................. 203/2
[58] Field of Search ....................................................... 203/2

[56] References Cited

U.S. PATENT DOCUMENTS

4,344,826  8/1982  Smith ........................................... 203/2

*Primary Examiner*—Edward J. Cain
*Attorney, Agent, or Firm*—Webb Ziesenheim Bruening Logsdon Orkin & Hanson, P.C.

[57] ABSTRACT

The invention concerns a method and device for controlling a distillation or condensation apparatus including a distillation vessel, heat source and condenser. A distillation or condensation apparatus consumes considerable quantities of cooling water which is discharged, through a length of hose connected to the condenser, directly into the drain. The aim of the invention is to propose a method and device for controlling a distillation or condensation apparatus to ensure a significant reduction in cooling-water consumption. The method proposed achieves this by virtue of the fact that the cooling water flowing through the condenser of the distillation or condensation apparatus is passed round in a closed loop, its temperature is measured in this loop and, when an upper temperature limit is reached, cooling water is replaced by feeding in cold water until a lower temperature limit is reached. The device proposed achieves the aim stated above by means of a cooling-water regulator connected to the condenser of the distillation or condensation apparatus through a pump to form the cooling-water loop, a valve connected to a cold-water supply line and operated by a controller, plus a temperature sensor located in the cooling-water loop, the controller operating the valve so that, when the upper cooling-water temperature limit is reached, the valve is opened until the cooling-water temperature reaches the lower limit.

28 Claims, 9 Drawing Sheets

METHOD AND A DEVICE FOR THE CONTROL OF A DISTILLATION OR CONDENSATION APPARATUS

DESCRIPTION

This invention relates to a method and a device for automatic control of a distillation or condensation apparatus comprising a boiling vessel, a heating device, and a condenser.

When a solution or suspension is heated or distilled by refluxing a mixture is heated to boiling in a reaction flask above a heating device, e.g. a magnetic stirrer with heating device, a heating mantle, an electric hot plate or the like. The vapour generated in this process is condensed in a cooling device which is flown through by a cooling agent and collected in a receiver flask in case of a distillation. While reflux-heating the vapour or gas just condenses and runs back into the reaction flask.

A chemical reaction can be run at a constant temperature with the latter process.

In most cases, a temperature sensor integrated in the heating device is used to monitor the temperature. Advanced magnetic stirrers with heating device are equipped with an extra thermometer for exact temperature stabilization of the mixture to be stirred. This may be either a mercury contact thermometer or a semiconductor-rsp. resistance-based thermometer that points directly into the mixture to be stirred or into the heating bath surrounding the reaction flask. This thermometer can be connected to the electronic circuitry of the magnetic stirrer by a plug-and-socket connection.

Distillation or condensation devices such as Liebig condensers, downflow reflux condensers or Allihn, Friedrichs, Graham, and Dimroth condensers are regularly connected to a cooling water feed valve by tubing while the cooling water that passes through the condenser is directly discharged into the sink through another piece of tubing. The appropriate flow of cooling water is adjusted manually to match the size of the condenser. The amount of drinking water consumed varies from 0.6 l/min to an excess of 3 l/min depending on the size of the condenser used.

Safety questions are another aspect to be considered in addition to the high consumption of drinking water. In many cases, in particular by inexperienced experimenters, only an insufficient amount of cooling water is supplied. This has resulted in explosions and laboratory fires causing severe personal injury and material damage.

One problem frequently occuring in this regard is swelling of seals of the usually available cooling water feed valves. This gradually decreases the net flow so that the cooling water supply may be sometimes insuffincient. No help as well are so-called "water flow controllers" which scan a rotating ball in a flow indicator optically and turn out the heating device connected to the condenser when the cooling agent flow is disturbed or drops below a variable value (e.g. 1 pulse/s). This known facility may help to prevent many accidents. However, it is unsatisfactory from an ecological point of view as the cooling water continues to flow.

Furthermore, it doesn't prevent water damages resulting from defect tubings. Moreover, swelling of seals or a temporary pressure drop in the cold water pipes may result in an unnecessary switch-off of the experimental set-up. The latter has been compensated only by setting the cooling water supply to high values which would be unnecessary otherwise.

Also known in laboratory practice are "thermostats" which can be connected with the condensation apparatuses. Thermostats using methanol or other organic solvents such as R134a as a cooling agent have a closed circuit which entails the disadvantage that a heat exchanger is required to facilitate the desired cooling effect.

This results in high energy lose. In addition, these facilities do not have adequate safety devices. They are bulky anyway requiring a major part of the laboratory or production space available.

Leaks which may occur when the condensation devices are inaccurately assembled cause big problems. The solvent evaporates slowly, and the evaporated residue decomposes or is polymerized. Occasionally there are explosions, in particular when the residue tends to form peroxides (e.g. tetrahydrofurane). The same problem happens with distillations.

It is the object of this invention to provide a method and a device of the type mentioned above which facilitate a considerable reduction in cooling water consumption.

According to the method of the invention this object is accomplished by running the cooling water flowing through the condenser of the distillation or the condensation apparatus in a circuit, measuring its temperature in this circuit, and replacing it once it has reached an upper temperature limit with an amount of cold water sufficient to allow the cooling water temperature to drop to a lower value.

The invention is based on the finding that the difference in temperature between the condenser and the vapor to be condensed has to be only a few degrees centigrade to ensure complete condensation. Thus it is neither necessary nor useful to condensate, for example, toluene at a temperature difference of almost 90° C. It is only in the border range of the temperature difference that a bigger cooling surface would be required to compensate for reduced cooling performance. But this is available anyway in properly assembled reaction setups as only about 10 to 20% of the cooling surface available is normally used for condensation. The same applies to condensation in Liebig condensers.

According to the invention a method is therefore proposed to circulate the cooling water after a single filling process of the cooling apparatus until it has heated to a freely selectable temperature. Only then the cooling water is replaced until the circulating cooling water has cooled to a specific preset temperature. Far more than 80% of cooling water can be saved by these replacement intervals.

In an advantageous improvement of the method according to the invention the cooling water temperature will be recorded in dependence of time, and a fault signal will be triggered at a positive temperature gradient exceeding a presetable limit and/or at a negative temperature gradient. The positive limit is exceeded whenever the solution or suspension is heated too much. The temperature drops below the negative limit by a desired or undesired break in the distillation or condensation process.

These additional safety functions can diminish the risk of accidents in a laboratory or a production plant.

Another safety function that reduces the risk of accidents may consist in triggering a fault signal when the cooling water temperature does not drop although cold water is supplied.

A further advantageous improvement is characterized by recording the power consumption of a pump located in the cooling water circuit and triggering a fault signal whenever a preselectable upper limit is exceeded and/or a preselectable lower limit is subceeded. In this way, the cooling water flow in the cooling water circuit and the pump can be monitored. An excessive power consumption of the pump will occur, for example, when an overflow unit projected to be located in the cooling water circuit is blocked or when there are kinks in the tubings; power consumption will be low when tubings have burst or were torn off, or when cooling water supply is insufficient.

The above mentioned fault signals can be used advantageously for a defined switch-off procedure of the distillation or condensation apparatus. In the event of a fault signal the heating device and/or—after a preselectable amount of time—the pump and, if present, a stirrer may be turned out.

In another advantageous embodiment a valve connected with the cooling water circuit is opened upon occurence of a fault signal for a specific preselectable amount of time and, the fault signal being still present, a pump located in the cooling water circuit and, if the apparatus has one, a stirrer are turned out.

Using apparatuses in which the boiling vessel is heated in a heating bath the solution or suspension can be heated with optimum energy efficiency by recording the heating bath temperature versus time and by controlling the power of the heating device using a status control so that the temperature gradient of the heating bath develops in a predetermined way until the selectable maximium heating bath temperature is reached.

In another advantageous embodiment the cooling water temperature versus time is recorded and the power of the heating device is controlled depending on the temperature gradient. Thus, the optimum heating bath temperature can be set independently for each solution or suspension.

The problem of high consumption of cooling water is solved by the device according to the invention by a is cooling water controller that can be connected to the condenser of a distillation or condensation apparatus and that includes a controller-governed valve that can be connected to the cold water pipe as well as a temperature sensor located in the cooling water circuit; that control governing this valve in such a way that the valve is opened when an upper cooling water temperature limit is reached and is kept open until the cooling water temperature has dropped to a lower value.

In a useful embodiment of the apparatus according to the invention a pump is located within the cooling water circuit. This construction should be selected because the differences in density occuring during heating are insufficient to facilitate a natural circulation of the so cooling water.

In another advantageous embodiment the cooling water circuit is designed as an open system with an overflow unit. This prevents the pressure within the apparatus from rising during the warming of the cooling water. So, contrary to service water heating devices, this device does not come under the provisions of the pressure vessel regulation act.

Other advantageous embodiments and further improvements of the invention are characterized in the sub-claims.

One example of the implementation of the invention is shown in the drawing and shall now be described in more detail. The figures represent the following schemes.

Figure 1:
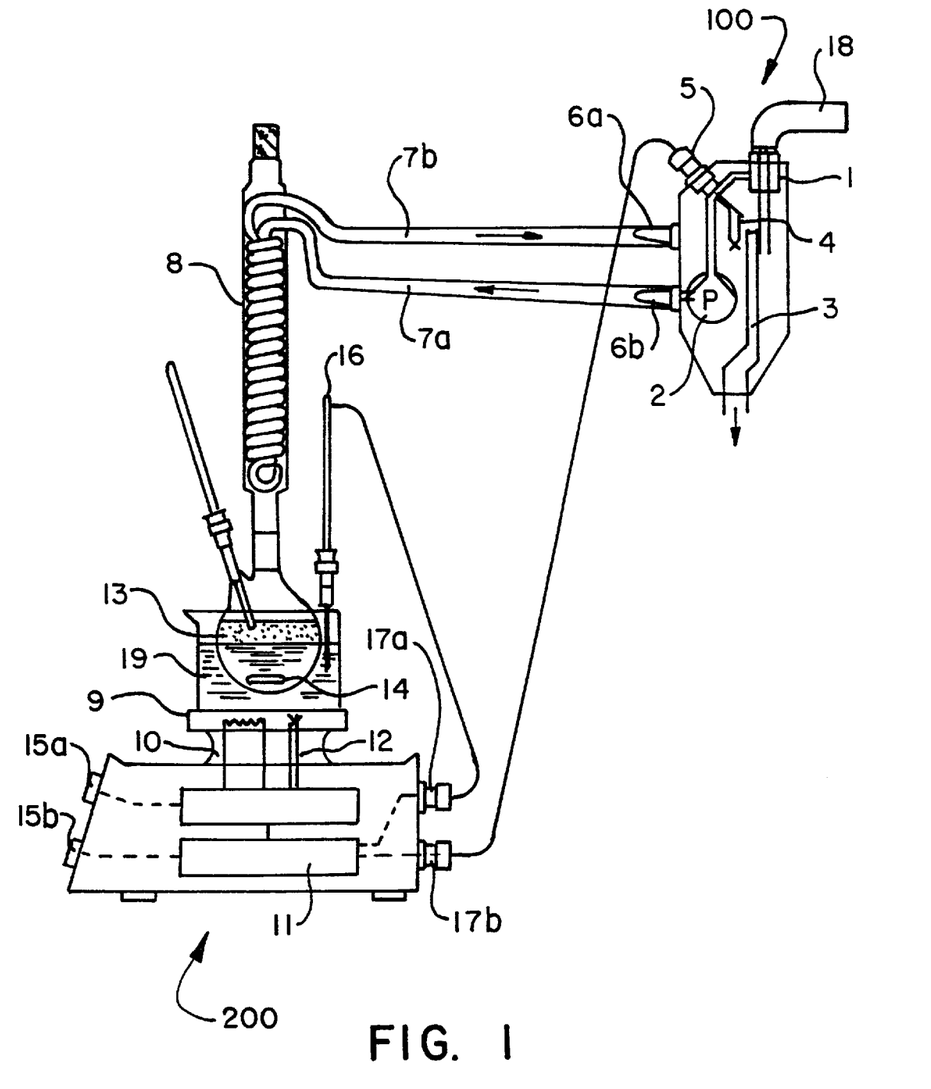
FIG. 1 shows a side view, partially a sectional view, of a condensation apparatus with a device according to the invention that includes a magnetic stirrer, a heating device, and a cooling water control.

FIG. 1 is a diagrammatic view of a condensation apparatus comprising a boiling flask 13 placed in a heating bath 19 and a reflux condenser 8. The apparatus, which contains a magnetic stirrer 200, a heating device 10, and a cooling water control unit 100, is monitored and controlled by the device according to the invention.

The cooling water control unit 100 consists mainly of a controllable cold water pipe valve 1, a pump 2, an overflow unit 3, a temperature sensor 4, and a socket for a controller 5 as well as an inlet and an outlet 6a, 6b. Via these sleeves 6a, 6b the cooling water control unit 100 is connected with the condenser 8 by the pieces of is tubing 7a, 7b to form a cooling water circuit. In addition, one or several sensors, not shown in detail, are provided for the cooling water control unit 100 or the cooling water circuit to monitor the cooling water level and/or cooling water circulation.

The magnetic stirrer 200 contains a support plate 9 with a heating device 10. A temperature sensor connected with the heating device 10 and a facility suited for generating a rotating magnetic field setting a magnetic stirrer bar 14 in the boiling flask 13 in rotation are located below the the support plate 9. For automatic monitoring and control the casing of the stirring assembly houses an electronic unit generally refered to as control. A socket 17a for a safety thermometer 16 and a second socket 17b for the cooling water control unit 100 are located at the back of the casing.

The potentiometers 15a and 15b are located at the front of the casing. Potentiometer 15a allows manual control of the capacity of the heating device 10 and, therefore, manual control of the heating bath temperature.

Potentiometer 15b allows setting of an upper limit $T_{max\ cooling}$ for the cooling water temperature. Furthermore, a lower limit $T_{min\ cooling}$ can be preset for the control using an additional potentiometer 15b.

The device is designed so that the control opens firstly the valve 1 of the cooling water control unit 100 connected with the cold water pipe for a specific amount of time upon turning on of the device. Cold water runs into the cooling water control unit 100, and is then pumped to the condenser 8 through the pump 2 and the lower piece of tubing 7a, fills the condenser, and runs back to the cooling water control unit 100 through the other piece of tubing 7b. Surplus cooling water and any air contained in the cooling water circuit are discharged through the overflow unit 3.

The valve 1 is closed when the cooling water circuit has been filled. Subsequently, both the pump 2 and the temperature sensor 4 send their respective signals via the connecting cable to the control. At the same time, the heating device 10 of the magnetic stirrer 200 is activated. The liquid in the boiling flask 13 is heated by means of the heating bath 19 and starts to boil after some time (cf. FIGS. 2 and 3, point A). The rising vapour is condensed in the reflux condenser 8 and runs back into the boiling flask 3. During this process the cooling water in the condenser 8 warms.

When a maximum cooling water temperature is reached (point B) valve 1 is opened again. Now, fresh cooling water runs into the cooling water circuit until the cooling water temperature has reched a lower limit (point C). As soon as this limit is reached valve 1 is shut again, and the cooling water can warm again. This process is repeated until the device is switched off manually.

Figure 2A:
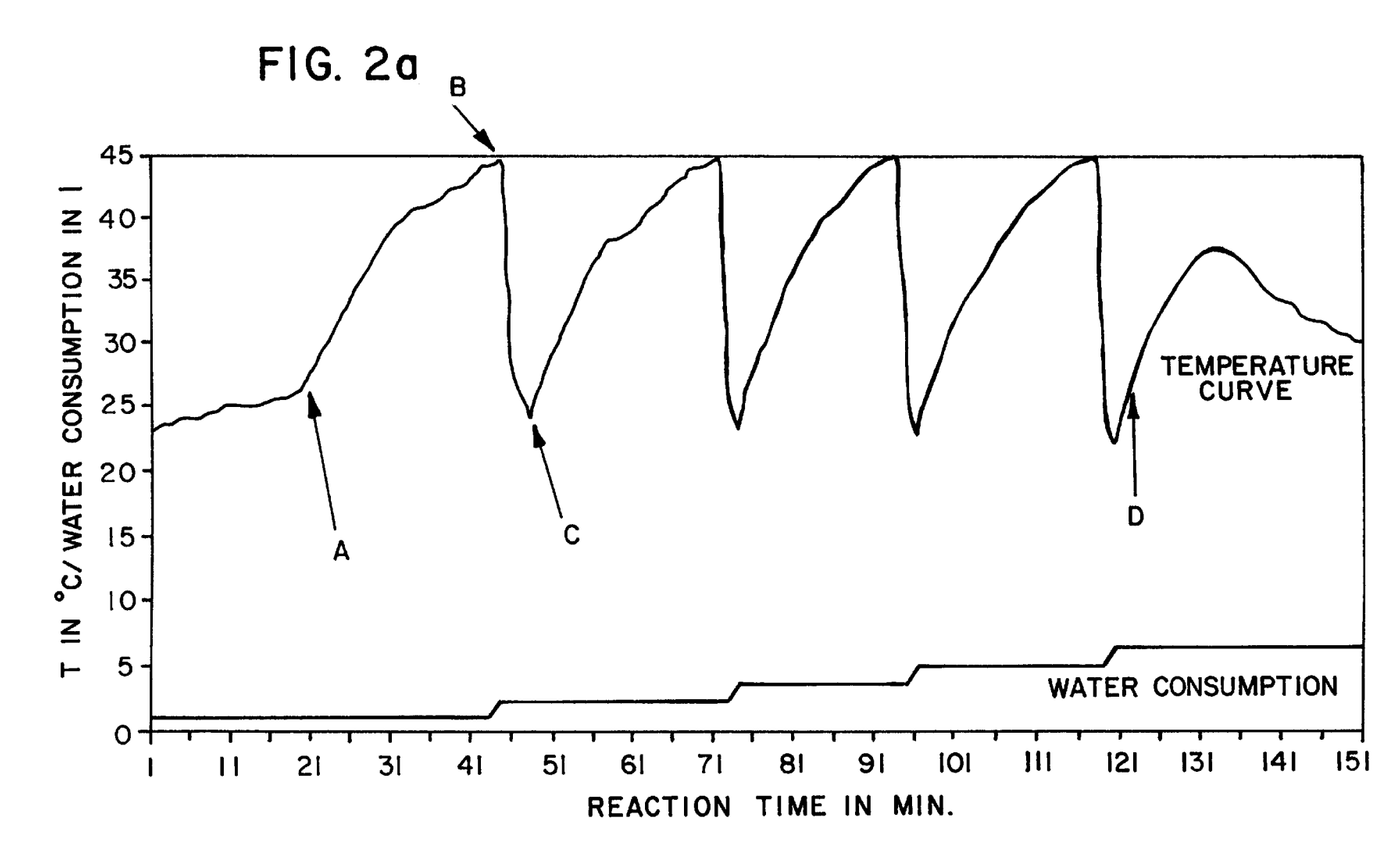
FIG. 2 shows the cooling water temperature versus time diagram for various solvents in case of refluxing.
Figure 2B:
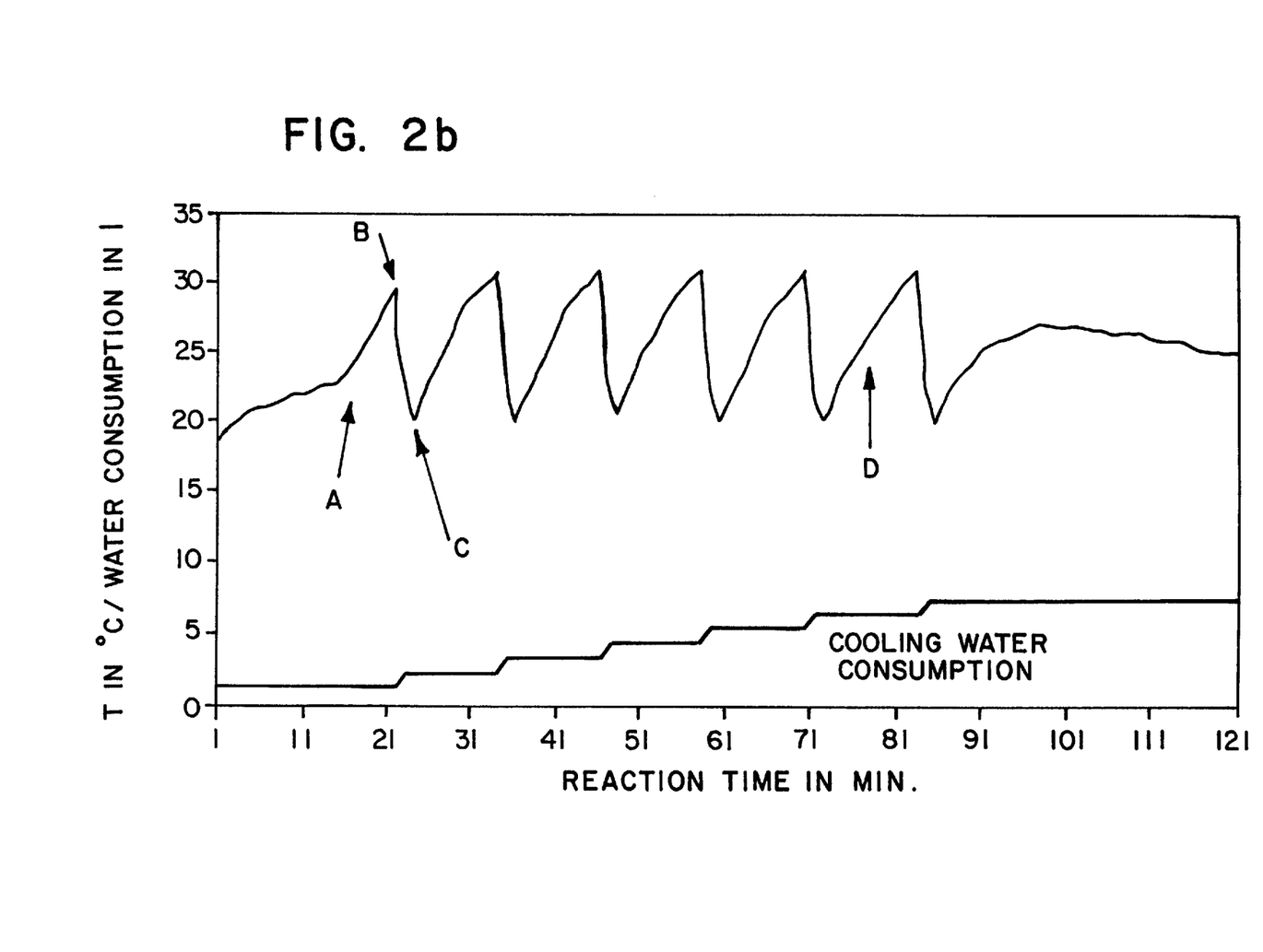
Figure 3:
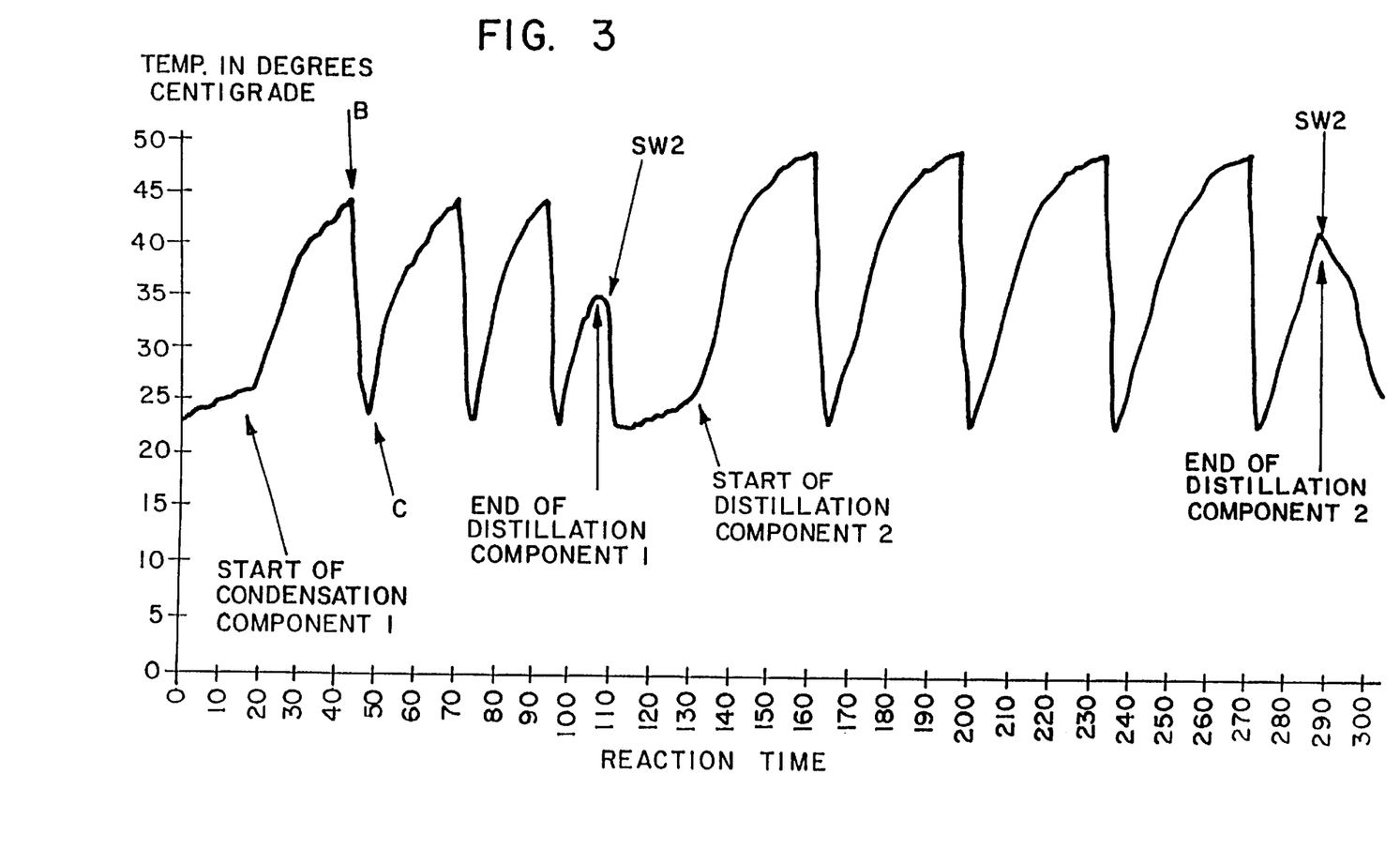
FIG. 3 shows an idealized cooling water temperature versus time diagram for a fractional distillation of a two-component mixture.

FIGS. 2a and 2b show the cooling water temperature versus time diagrams for methanol (2a) and diethyl ether (2b). It is clearly visible that the temperature of the cooling water rises only slightly in a normal condensation process and the slope of the curver is zero, ideally. A significant rise of the cooling water temperature occurs only at the start of the condensation (cf. point A).

Ideally, this rise is between 1° C. and 2° C./min and is only interrupted by the phases during which cooling water is replaced. At the end of the distillation, or at the end of a distillation of a component in a fractional distillation process, or when the heating device is defect, or when the solvent is unintentionally evaporated during refluxing the gradient of the cooling water temperature slowly decreases, passes the zero level and soon turns negative. This temperature versus time dependence is characteristic of all condensation processes.

In addition, the cooling water consumption in liters versus time in minutes is shown in FIGS. 2a and 2b.

Figure 4:
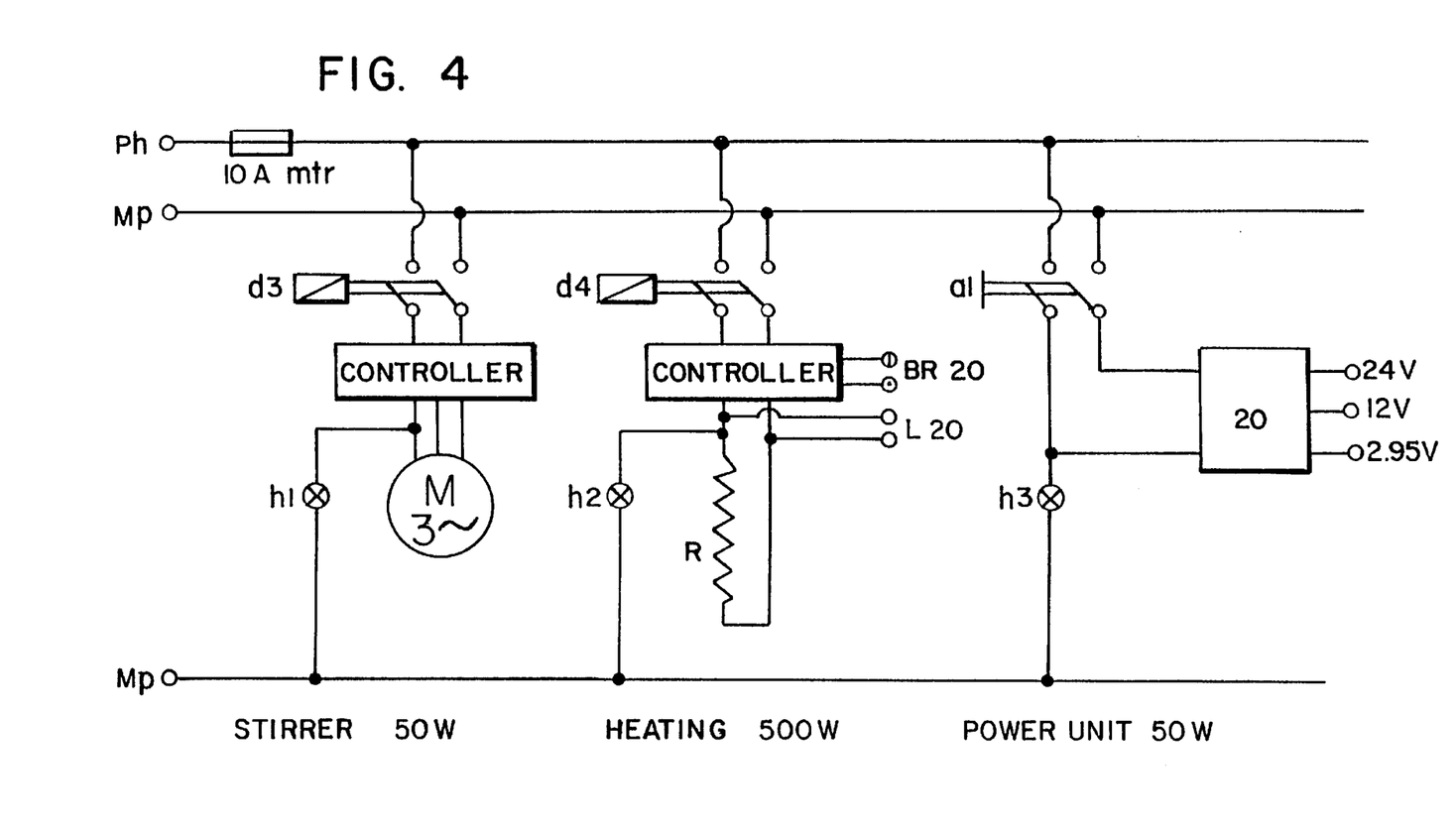
FIG. 4 shows a connection diagram of the heating device, the stirrer, and the power supply unit of a device according to the invention referring to FIG. 1.

Without defining the final design FIG. 4 presents a possible connection diagram for the magnetic stirrer, the heating device and an electronic power unit for the control. This circuit also allows the connection of an external heating device. An earthing-pin coupler for non-heating appliances $L_{20}$ and a bridge $BR_{20}$ for shorting the controller of the internal heating device 10 are provided for this purpose.

The power unit 20 is a direct-current unit designed for 220 V 50 Hz alternating current on its input side. On output side we have low voltages direct current, smoothed and stabilized, short-circuit-proved, of 24 volts for the cold water feed valve 1 and of 12 volts for the pump 2 as well as a reference voltage of 2.95 volts. Thus, all voltages applied to the cooling water control unit are low voltages which are harmless to humans.

Figure 5:
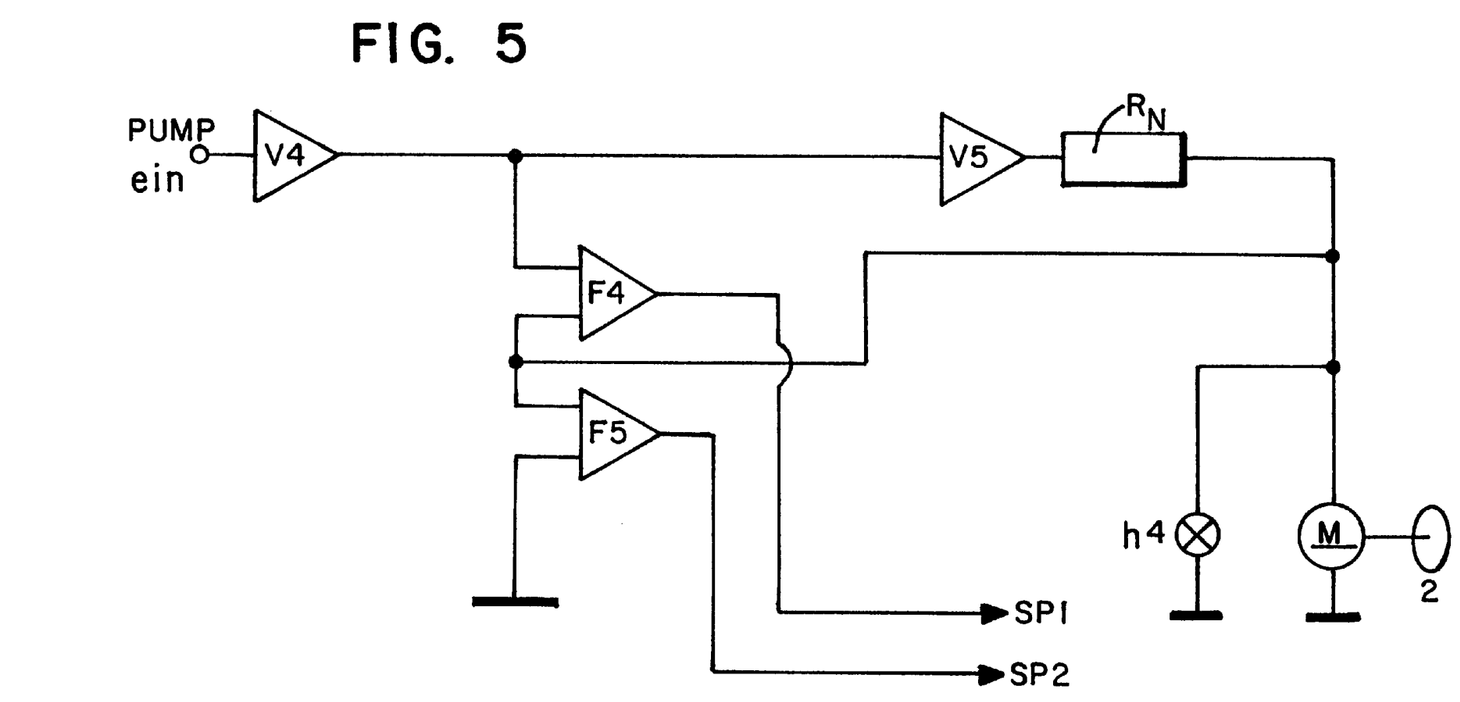
FIG. 5 shows a connection diagram of a pump control system.

As can be seen in FIG. 5, the pump 2 is triggered by an amplifier $V_5$ via a shunt resistor RN (Shunt). The voltage drop across the shunt resistor is used as the analog value for the pumping power. Bigger pumping power deviations are detected as fault signals by the filters $F_4$ and $F_5$, which are mainly integrating; fault signal Sp1 is triggered when the power consumption is too high, and fault signal Sp2 is triggered when the power consumption is too low. Fault signal Sp1 is triggered when there is excess pressure in the cooling water control unit 100 which may occur when the cooling water circuit is blocked or when there is a kink in the tubings 7a, 7b. Fault signal Sp2, however, is triggered when the amount of cooling water is too low, e. g. when the tubings 7a, 7b have burst or were torn off or when the cooling water supply is insufficient. In this way, the cooling water flow through the condenser 8 is monitored with intrinsic safety. The pre-amplifier $V_4$, is used to turn the pump 2 on and out.

Figure 6:
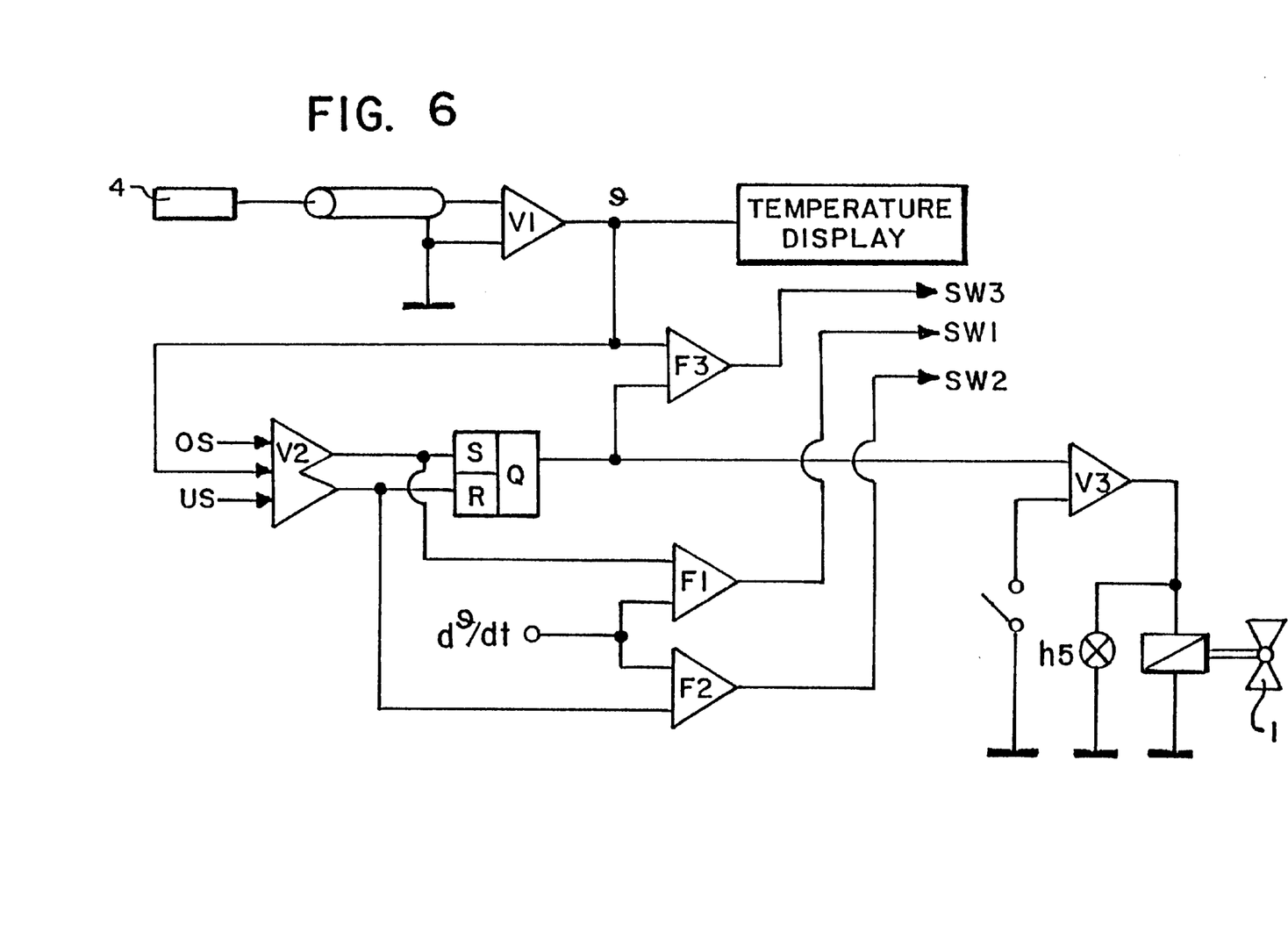
FIG. 6 shows a connection diagram of a valve control system.

As shown in FIG. 6, the cooling water temperature is controlled by using a temperature sensor 4. Its characteristic curve, linearized and matched, is measured by an amplifier $V_1$, and send to a window comparator $V_2$ as signal θ. OS in FIG. 6 represents the upper cooling water temperature limit T$max\ cooling$ set using the potentiometer 15b (cf. FIG. 1), $U_s$ represents the preset lower cooling water temperature limit $T_{min\ cooling}$. Exceeding $T_{max\ cooling}$ a RS bistable flip-flop element is set and the magnet controlled valve 1 is opened by means of a short-circuit-proof switching amplifier $V_3$. By dropping of the cooling water temperature below $T_{min\ cooling}$ the flip-flop is reset and the valve is closed.

The time dependence of the cooling water temperature is monitored by filters $F_1$, $F_2$, and $F_3$. The inputs of filters $F_1$ and $F_2$ mainly show derivative action (dθ/dt). Filter $F_2$ triggers the fault signal $S_w 2$ whenever the temperature gradient of the cooling water turns negative. This is the cave, when the first component in a fractional distillation of a fixture was completely evaporated. (FIG. 3 point X); but also when the liquid to be condensed was evaporated to a minimum in a distillation is or refluxing process. Filter $F_1$ triggers the fault signal $S_w 1$ whenever the positive values of the cooling water temperature gradient become too big. This happens, for example, when the heating power is too big and the condenser not being able any longer to dissipate the heat as required. Filter $F_3$ triggers the fault signal $S_w 3$ when a manipulated variable is limited. This happens when the cooling water temperature cannot be reduced to a value below Tmax cooling although cold water is supplied. Such a case may occur, for example, when the cold water supply is either obstructed or has failed completely.

The cooling water temperature is thus continually monitored and used for controlling and protecting the distillation or condensation apparatus.

Figure 7A:
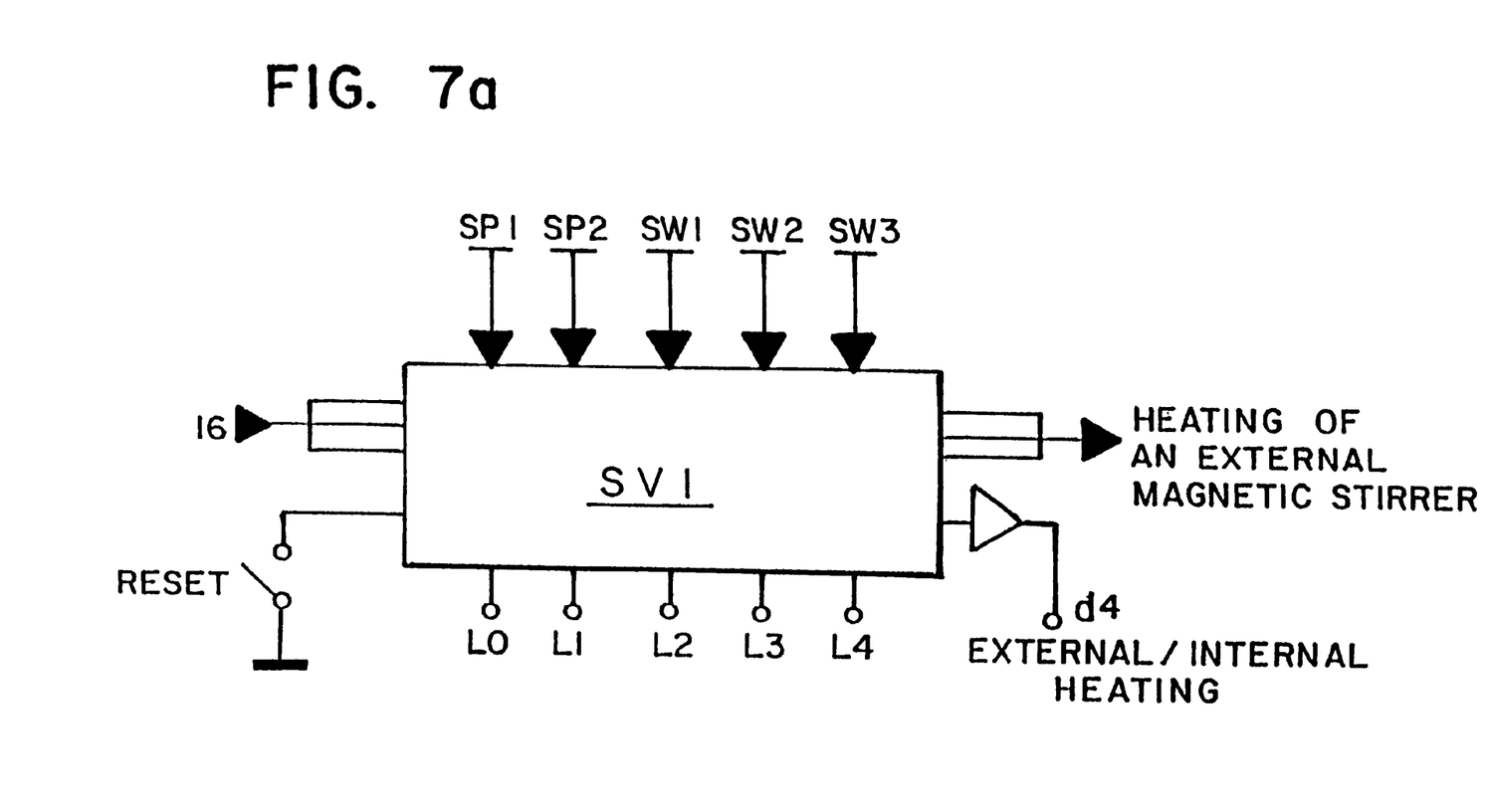
FIGS. 7a and 7b show a functional diagram of a switching amplifier and a switch-off diagram providing flexible response to specific fault signals, respectively.

FIG. 7a is a diagrammatic view of a switching amplifier SV1 which controls the filling of the cooling water circuit and, if required, the reset of the device according to the invention. In addition, it monitors the safety thermometer 16 located in the heating bath 19 and controls the heating device via connection d4. Until the preset maximum heating bath temperature $T_{max\ heating\ bath}$ is reached the heating power is controlled to result in a constant temperature gradient of the heating bath 19 of 3° C. to 5° C./min. The liquid to be condensed is thus heated very efficiently. Preferably, the safety thermometer 16 is either a semiconductor or a resistance thermometer.

Figure 7B:
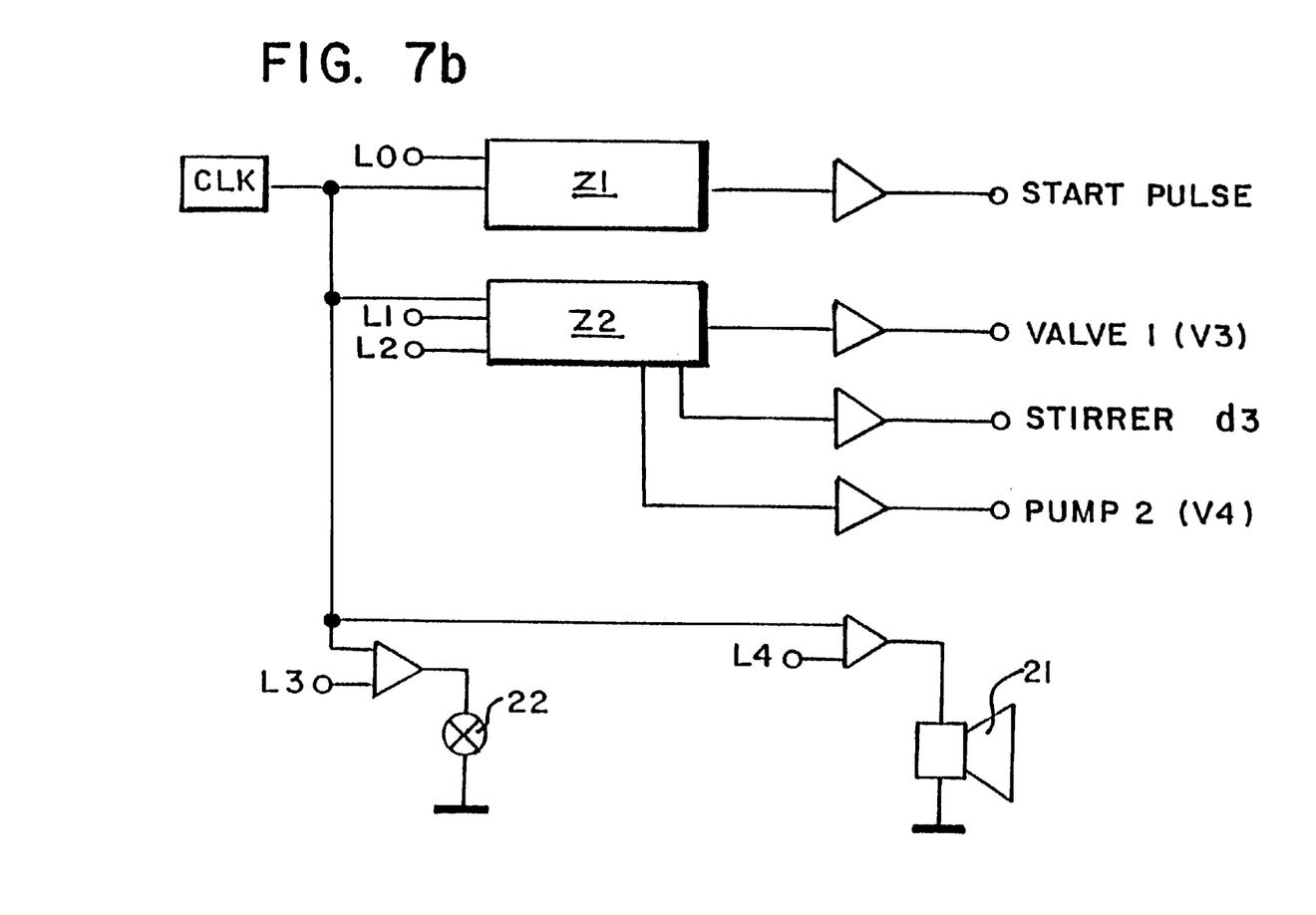

Furthermore, the switching amplifier SV1 initiates the switch-off procedures described below when the fault signals Sp1, Sp2, $S_w 1$, $S_w 2$, and/or $S_w 3$ occur. Referring to FIG. 7b, and with ongoing reference to FIG. 7a, when the fault signals Sp1, Sp2, $S_w 1$, $S_w 2$, or $S_w 3$ occur the heating device 10 is switched off immediately at any rate, and an optical and/or acoustical signal is triggered by the respective sensing element 21 or 22.

During trouble-free operation the signals of the safety thermometer 16 cause the switching on and off of the heating device 10 depending on whether the heating bath temperature has reached a value preset with potentionmeter 15a or not.

It an external magnetic stirrer with heating device and a safety thermometer is connected to control 11, its signals are routed without change to the safety device of the external unit.

In addition to switching off the heating device upon occurence of the fault signals Sp1 and Sp2, a new start pulse is triggered opening the valve 1 for a specific amount of time. If another fault signal is encountered switch-off procedure 2 is executed in which valve 1 is not opened again but only pump 2 is turned out after a specific amount of time, and subsequently the magnetic stirrer is turned out. Since the occurence of the fault signals Sp1 and Sp2 invariably indicates that there is a fault in the cooling water supply valve 1 will not be opened again in switch-off procedure 2.

When the fault signals $S_w 1$, $S_w 2$, and/or $S_w 3$ occur the heating device 10 is switched off firstly and valve 1 is opened for a specific amount of time. If the fault cannot be corrected in this amount of time switch-off procedure 1 is executed; i. e. valve 1 is opened and closed after 8 minutes, for example. Then pump 2 is switched off after about 16 minutes and the stirrer after about 32 minutes. The switching amplifier SV1 is connected with the counters Z1 and Z2 for this purpose.

The heating device remains turned out in both switch-off procedures, and the optical and/or acoustical signal remains switched on. The faults can be reset lay pressing a reset key. A start pulse is triggered, and the device is reset to its initial state.

This invention is not limited to the preferred application described therefor. Various changes and modifications are conceivable which utilize the solution presented even with fundamentally different designs. In particular, the design is not limited to discrete logic module groups but may be advantageously applied using programed logic in combination with a microprocessor, preferably.

We claim:

1. A method for the automatic control of a distillation or a condensation apparatus including a boiling vessel, a heating device, and a condenser, said method comprising the steps of:

running cooling water flowing through the condenser in a circuit;

detecting the temperature of the cooling water in the circuit; and replacing the cooling water in the circuit upon reaching an upper temperature limit by supplying cold water until a lower temperature limit is reached.

2. The method according to claim 1 further including the steps of:

recording a time dependence of the cooling water temperature; and triggering a fault signal when one of a positive temperature gradient of the cooling water flowing in the circuit exceeds a preselectable limit and a temperature gradient of the cooling water flowing in the circuit turns negative.

3. The method according to claim 1 further including the step of triggering a fault signal when the cooling water temperature is not reduced although cold water is supplied.

4. The method according to claim 1 further including the steps of:

monitoring power consumption of a pump located in the cooling water circuit; and triggering a fault signal when the power consumption one of exceeds a preselectable upper limit and falls below a preselectable lower limit.

5. The method according to claim 1 further including the step of executing a defined switch-off procedure of the distillation and condensation apparatus when a fault signal occurs.

6. The method according to claim 1 further including the step of switching off the heating device when a fault signal occurs.

7. The method according to claim 1 further including the steps of:

opening a valve connected with the cooling water circuit for a specific preselectable amount of time when a fault signal occurs; and turning off a pump located in the cooling water circuit and, if present, a stirrer of the apparatus when the fault signal is still present.

8. The method according to claim 4 including the step of switching off the pump and, if present, a stirrer of the apparatus after a specific preselectable amount of time when a fault signal occurs.

9. The method according to claim 1 wherein the boiling vessel is surrounded by a heating bath and further including the steps of:

recording a time dependence of the heating bath temperature; and controlling the power of the heating device using a status control so that the temperature gradient of the heating bath runs a predefined course until an adjustable maximum heating bath temperature is reached.

10. The method according to claim 1 further including the steps of:

recording the time dependence of the cooling water temperature; and controlling the power of the heating device depending on the temperature gradient.

11. A device for the automatic control of a distillation or condensation apparatus comprising a boiling vessel, a heating device, and a condenser, the automatic control device comprising:

a cooling water control unit which can be connected with the condenser by means of a pump to form a cooling water circuit;

a valve connected between the condenser and a cold water supply pipe; and a control connected to the valve and a first temperature sensor located in the cooling water circuit, with the control operating the valve so that it is opened when an upper cooling water temperature is reached and that it remains open until the cooling water temperature reaches a lower value.

12. The device according to claim 11 wherein the cooling water circuit is an open system with an overflow unit.

13. The device according to claim 11 wherein an upper and/or a lower limit of the cooling water temperature can be set at the control.

14. The device according to claim 11 further including a sensor in the cooling water circuit to measure the cooling water level and/or the cooling water circulation.

15. The device according to claim 11 wherein the control records the cooling water temperature versus time by means of the first temperature sensor located in the cooling water circuit and triggers a fault signal when one of a temperature gradient exceeds a positive preselectable limit and the temperature gradient turns negative.

16. The device according to claim 11 wherein the control records the cooling water temperature by means of the first temperature sensor located in the cooling water circuit and triggers a fault signal whenever the temperature is not reduced although the valve is open.

17. The device according to claim 11 wherein the control monitors the power consumption of the pump and triggers a fault signal when one of the power consumption of the pump exceeds a preselectable upper power limit and the power consumption of the pump drops below a preselectable lower power limit.

18. The device according to claim 15 wherein a defined switch-off procedure is executed for the distillation or condensation apparatus when the fault signal is triggered.

19. The device according to claim 15 wherein the control switches off the heating device when the fault signal is triggered.

20. The device according to claim 11 wherein the control opens the valve for a specific preselectable amount of time and, in case of a continuing fault signal, switches off the pump and, if present, a stirrer of the apparatus.

21. The device according to claim 17 wherein the control switches off the pump when fault signal occurs and, if present, a stirrer of the apparatus after a specific preselectable amount of time.

22. The device according to claim 11 wherein:

the boiling vessel is surrounded by a heating bath;

the control records the heating bath temperature versus time by means of a second temperature sensor; and the control controls the power of the heating device so that a temperature gradient of the heating bath runs an adjustable course until an adjustable maximum heating bath temperature is reached.

23. The device according to claim 11 wherein:

the control records, by means of a second temperature sensor, a temperature versus time of a heating bath surrounding the boiling vessel; and the control controls the power of the heating device in dependence of a temperature gradient detected by the second temperature sensor.

24. The device according to claim 11 wherein the control and the heating device are combined in an integrated unit.

25. The device according to claim 24 wherein the integrated unit is a magnetic stirrer.

26. The device according to claim 24 wherein the cooling water control unit is able to be connected with the integrated unit by means of an electrical plug-and-socket connection.

27. The device according to claim 11 wherein one of the control and the cooling water control unit is connected with a magnetic stirrer and an integrated heating device via an electrical plug-and-socket connection.

28. The device according to claim 11 wherein all electrical facilities of the cooling water control are operated at a DC voltage equal to or less than 24 volts.

* * * * *

UNITED STATES PATENT AND TRADEMARK OFFICE
CERTIFICATE OF CORRECTION

PATENT NO. : 5,976,323
DATED : November 2, 1999
INVENTOR(S) : Eckhardt Milde et al.

It is certified that error appears in the above-identified patent and that said Letters Patent is hereby corrected as shown below:

Title Page, [56] References Cited, insert:
--FOREIGN PATENT DOCUMENTS
    3001995    6/1989    Germany
    3248501    7/1984    Germany--.

Column 2 Line 7 "energy lose." should read --energy loss--.

Column 3 Lines 33-34 "by a is cooling" should read
--by a cooling--.

Column 3 Line 46 "of the so cooling" should read
--of the cooling--.

Column 4 Line 22 "of is tubing 7a" should read --of tubing 7a--.

Column 5 Line 64 "T*max cooling*" should read --$T_{max\ cooling}$--.

Column 6 Line 10 "fixture" should read --mixture--.

Column 6 Line 12 "in a distillation is or" should read
--in a distillation or--.

Column 6 Line 52 "It an" should read --If an--.

Column 7 Line 10 "lay pressing" should read --by pressing--.

Column 7 Line 18 "programed" should read --programmed--.

UNITED STATES PATENT AND TRADEMARK OFFICE
CERTIFICATE OF CORRECTION

PATENT NO. : 5,976,323
DATED : November 2, 1999
INVENTOR(S) : Eckhardt Milde et al.

It is certified that error appears in the above-identified patent and that said Letters Patent is hereby corrected as shown below:

Claim 21, Column 9 Line 4, "when fault" should read --when the fault--.

Signed and Sealed this

Twelfth Day of September, 2000

Attest:

Q. TODD DICKINSON

Attesting Officer

Director of Patents and Trademarks